Feb. 12, 1929.
H. O. PUTT
RELAY
Filed Nov. 5, 1925
4 Sheets—Sheet 1
1,701,634
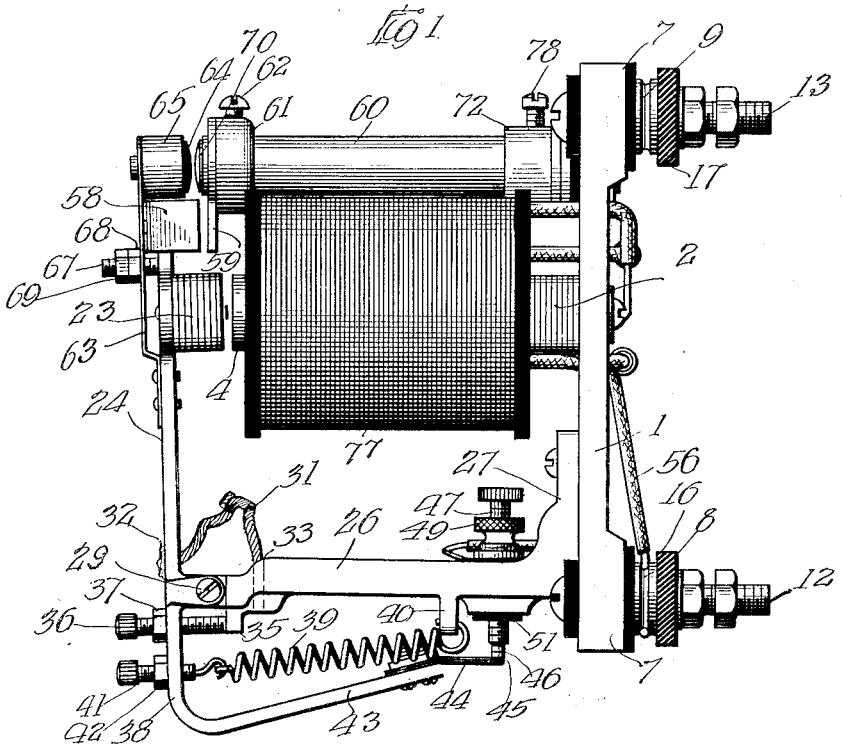
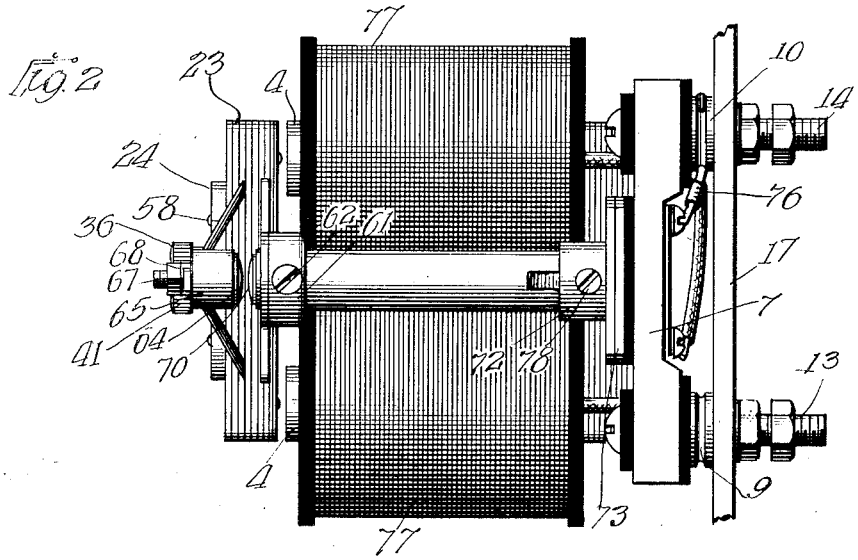

Feb. 12, 1929.

H. O. PUTT

RELAY

Filed Nov. 5, 1925

Witnesses:
Harry E. White
William P. Kilroy

Inventor
Harlie O. Putt
By Brown, Boettcher & Brenner
Attys.

Feb. 12, 1929.
H. O. PUTT
1,701,634
RELAY
Filed Nov. 5, 1925 4 Sheets-Sheet 3
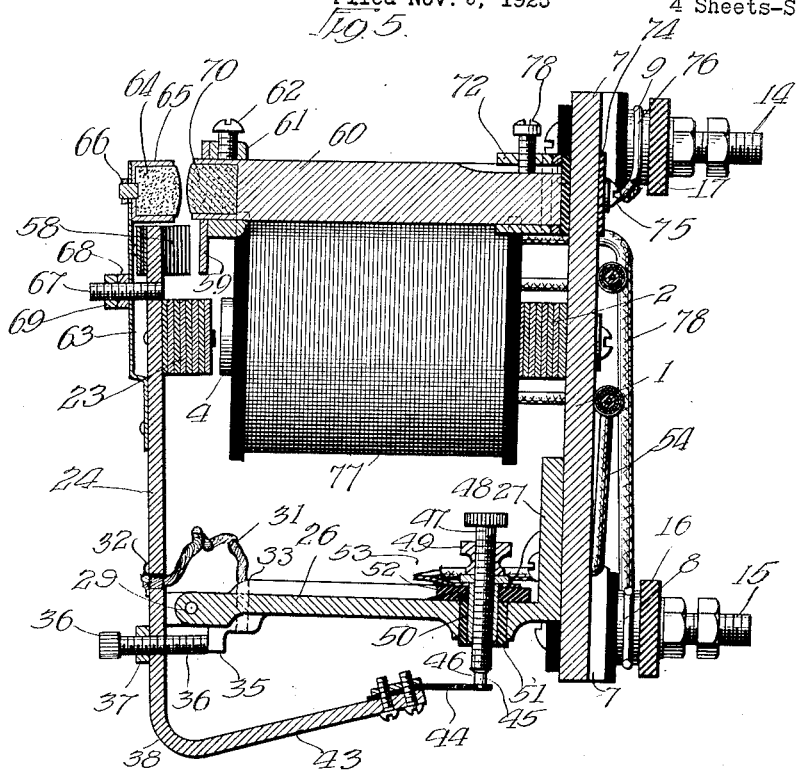
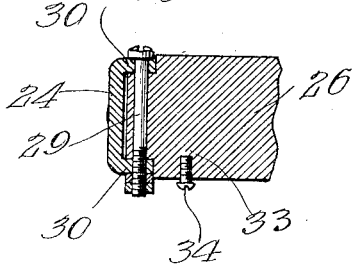
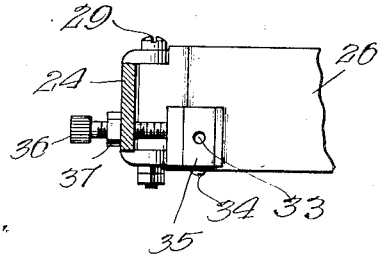
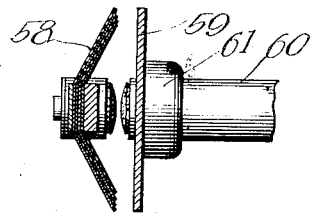
Witnesses
Harry R. White
William P. Kilroy
Inventor:
Harlie O. Putt
By Brown Boettcher Dienner
Attys.

Feb. 12, 1929.  H. O. PUTT  1,701,634
RELAY
Filed Nov. 5, 1925  4 Sheets-Sheet 4
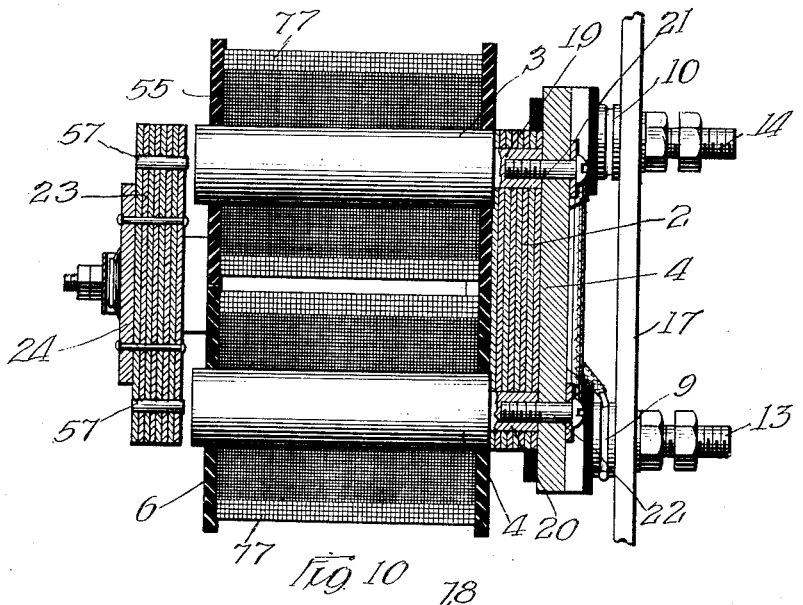
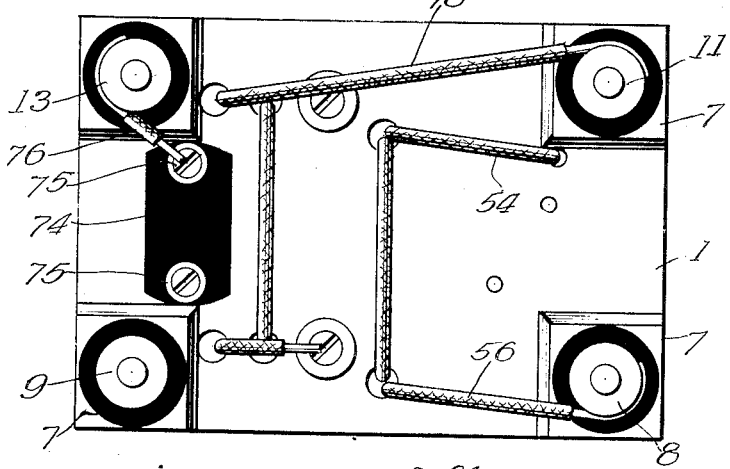
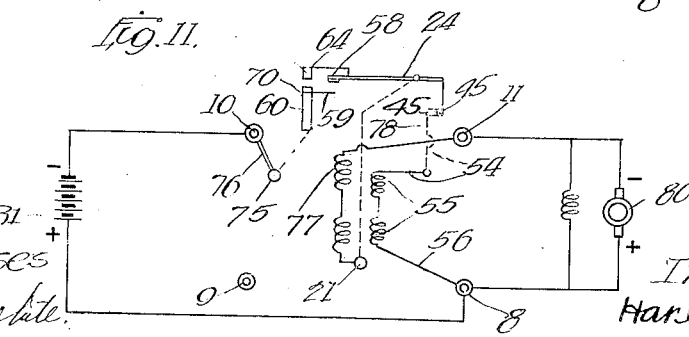

Patented Feb. 12, 1929.

1,701,634

UNITED STATES PATENT OFFICE.

HARLIE O. PUTT, OF ELKHART, INDIANA, ASSIGNOR TO HERBERT E. BUCKLEN CORPORATION, OF ELKHART, INDIANA, A CORPORATION OF INDIANA.

RELAY.

Application filed November 5, 1925. Serial No. 66,928.

My invention relates to electric relays, more particularly of the type which is designated by the term "cut-out" for connecting and disconnecting the generator and the storage battery in a battery charging system.

The particular relay which is shown hereafter in detail is employed by me in connection with electric generators driven by wind power. For such class of service great sensitiveness and reliability are essential. It is desirable that a wind driven generator be able to pick up load upon temporary gusts of wind, and for this reason the relay must be immediately and accurately responsive to conditions.

One of the difficulties which has been encountered in relays of this class is the heating to which the coils are subjected due to constant flow through the windings, both before the main contacts are closed when the voltage of the generator is insufficient to charge the battery, and after the main contacts are closed, when the voltage is sufficient to charge the battery.

I have found that if the shunt winding be opened when the voltage rises above a predetermined value, as for example the value which corresponds to the cut-in voltage, the relay will not be injuriously affected by heating, as the heat which is developed by current flow caused by voltage less than the cut-in voltage can be dissipated without serious temperature rise.

Upon a consideration of the reasons for the same, it may be observed that with a given resistance of circuit the heat which is developed therein increases as a function of the square of the impressed electromotive force. Thus, for example, in a thirty two volt system the heating which would be developed by the shunt winding at thirty eight volts would be of the order of 40% greater than the heat which would be developed at thirty two volts, and by way of further example, would be approximately fourteen times as great for thirty eight volts as it would for ten volts.

I have devised a relay which cuts out the shunt winding upon closing of the series winding, and have arranged the windings of the relay so that the heat from the series coil may be readily dissipated as the same is placed on the outside of the shunt winding, and this makes the shunt winding more accurate and sensitive by being disposed immediately upon the core.

The necessity for sensitiveness and accuracy of the relay and the necessity for preventing excessive temperature rise, is aggravated in a system of the kind which I have described because of the relatively long leads from the generator on top of the wind mill tower to the battery, which is placed at some convenient point under cover at the base of the tower.

In connection with the construction of the relay of my invention I have provided certain structural improvements which assist in the production in simple form of a sensitive and reliable instrument of this character, all of which will be more apparent from the following detail description of a specific embodiment of my invention.

In order to acquaint those skilled in the art with the manner of constructing and operating a device embodying my invention, I shall describe in connection with the accompanying drawings, one form of the same.

In the drawings:—

Figure 1 is a side elevational view of a relay of my invention mounted upon a suitable supporting strip;

Fig. 2 is a top plan view of the same;

Fig. 5 is a vertical section taken on the line 5—5 of Fig. 3;

Fig. 6 is a fragmentary sectional view through the pivot, taken on the line 6—6 of Fig. 3;

Fig. 7 is a fragmentary section taken on the line 7—7 of Fig. 3;

Fig. 8 is a fragmentary section taken on the line 8—8 of Fig. 3;

Fig. 9 is a horizontal section taken on the line 9—9 of Fig. 3;

Fig. 10 is a rear elevational view of the relay; and

Fig. 11 is a diagram of connection.

Figure 3:
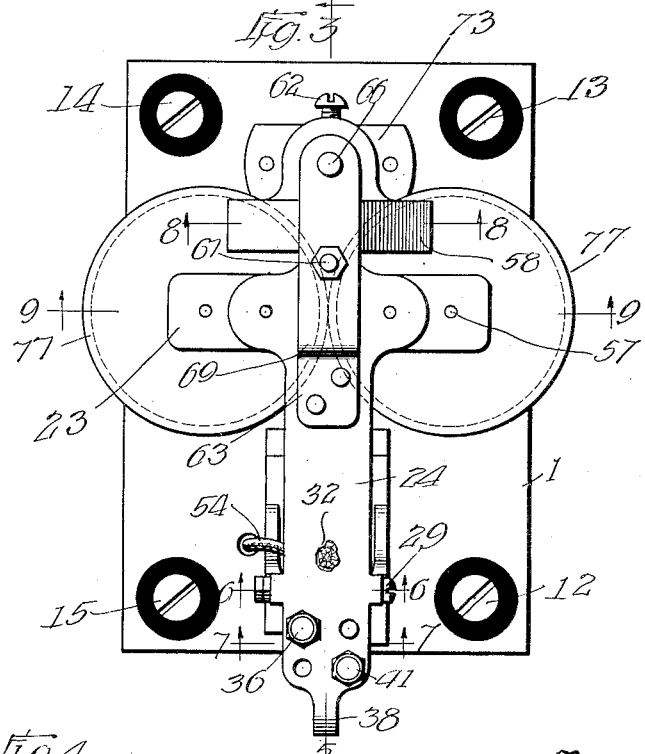
Fig. 3 is a front elevational view taken from the left of Fig. 1.
Figure 4:
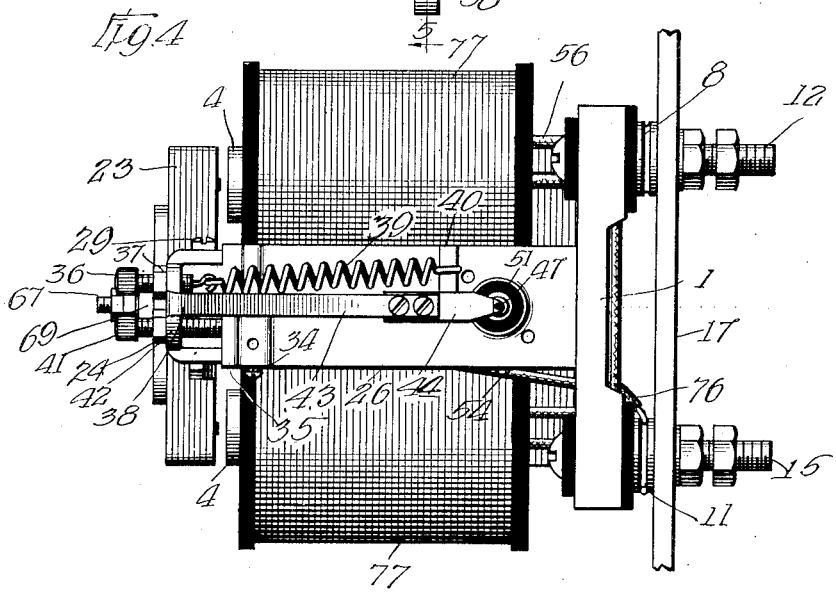
Fig. 4 is a bottom plan view.

The relay shown in Fig. 1 comprises a base 1, which in the present case is made of a casting of aluminum for the more ready dissipation of heat from the yoke 2 joining the cores 3 and 4 and from the shunt windings 55 which are disposed upon said cores 3 and 4. The base 1 has bosses 7 formed at the four corners thereof, and these bosses are drilled and bushed with insulation to receive the hollow brass legs 8, 9, 10 and 11. Terminal and mounting bolts 12, 13, 14 and 15 extend through the hollow legs 9 and pass through a mounting board of insulation, in the present case shown as two strips 16 and 17 of insulating material, to provide terminals upon the rear of the mountings 16, 17 for the connection of circuit wires.

The magnet structure comprises the yoke 2, which is formed of a series of thin bars of soft iron with the reduced ends of the pole pieces 3 and 4 projecting into holes therein.

It is to be observed that these laminations of which the yoke 2 is formed are in planes transverse to the general plane of the magnet system. The pole pieces 3 and 4 have shoulders formed at the junction of the reduced ends 19 and 20, and these shoulders seat against the uppermost lamination. The reduced ends 19 and 20 are internally threaded to receive the clamping bolts 21 and 22, these bolts being grounded on the base plate 1.

A suitable magnetic armature 23 completes the magnetic circuit. This armature comprises a series of laminations lying in planes parallel to the laminations of the yoke member 2, that is, at right angles to the general plane of the magnetic system.

These laminations are riveted together and mounted upon the armature lever 24, which is pivoted at 29 to the bracket 26.

Brass pins 57 are set in the armature 23 to contact with the cores 3 and 4, and they serve to space the armature away from these cores 3 and 4 when the armature is attracted to preserve sufficient air gap between these parts to prevent sticking of the armature to the magnet poles.

The bracket 26 is generally L-shaped having a foot 27 which is secured upon the aluminum base 1, this bracket being preferably made of brass. The outer end of the bracket 26 carries a pivot pin 29 which projects through lugs or ears 30, formed on the sides of the armature bar 24 (see Fig. 6), to form a pivotal connection between the armature bar and the bracket. The pin 29 is preferably in the form of a machine screw secured with suitable locking nuts, so that the pin may be readily removed. The bracket 26 is grounded on the base plate 1 and the armature is electrically tied to the bracket 26 by means of the flexible conductor or pigtail 31, one end of which is soldered to the armature bar 24, as indicated at 32, and the other end of which is inserted into an opening 33 in the bracket 26 and held therein by the set screw 34. This releasable connection to the set screw permits the armature bar to be removed from the bracket 26. The bracket 26 has at its outer end a lug forming a stop shoulder, as indicated at 35, for engagement by a suitable stop screw 36 threaded through the rearward extension of the armature bar 24. A suitable lock nut 37 locks the stop screw 36 in adjusted position.

The rearward extension 38 of the armature bar 24 is connected by a tension spring 39 with a suitable lug or ear 40 formed on the back of the bracket 26. The tension of the spring 39 is adjusted through a suitable adjusting screw 41 and nut 42 to regulate the resistance to attraction of the armature 23. The rearward extension 38 of the armature bar 24 has an arm 43 extending towards the base member 1, and this arm 43 carries a contact spring 44, carrying at its outer end a contact point 45 of suitable contact metal cooperating with a corresponding point 46 mounted on the contact screw 47, which contact screw is mounted in the lower part of the bracket 26 in insulated relation thereto. The screw 47 preferably has a suitable milled head 48 and a milled locking nut 49, so that the same may readily be adjusted and locked by the fingers of the operator. The screw 47 is threaded through a tubular brass nut 50, and this tubular brass nut is held out of engagement with the grounded bracket 26 by a bushing 51 and washer 52 of insulating material. The tubular nut 50 is connected to a sheet metal terminal 53 which in turn is connected to a conductor 54 with one terminal of the shunt windings 55, which shunt windings are disposed next to the cores 3 and 4 of the magnetic system. The cores 3 and 4 have heads of insulating material for confining the windings in a well known manner. The opposite end of the shunt winding 55 is connected to terminal 8 through a conductor 56 which may be seen in Figure 10 on the base of the relay.

The armature bar 24 carries at its forward end the main laminated contact 58 which is formed of a plurality of spring copper leaves riveted directly upon the end of the armature bar. This laminated contact is suitably arched so that the ends of the laminations may engage by a scraping action with a stationary contact plate 59, which is secured upon the upper end of the metal post 60 through the medium of a collar 61. This collar 61 has the plate 59 secured thereto or formed integral therewith and it is adjustable rotarily and axially on the brass post 60. The set screw 62 holds the collar 61 in place upon the post 60. The armature bar 24 also carries through the medium of a leaf spring 63 an auxiliary or arcing contact 64 comprising a carbon button secured in a suitable shell 65, which shell 65 is fastened to the outer end of the leaf spring 63 through a small stud and nut 66. The position of the leaf spring 63 and consequently of the auxiliary contact 64 is controlled by an adjusting screw comprising a stud 67 upon which there is threaded an adjusting nut 68 and a lock nut 69.

The auxiliary contact 64 co-operates with a like stationary auxiliary contact comprising the carbon button 70 mounted in a recess formed in the outer end of the rod 60. The adjustment of the parts is such that the carbon buttons 64 and 70 contact in advance of closing of the main contact. The adjustment of the contacts 45 and 46 is such that the shunt circuit is opened at this point as soon as the auxiliary contacts 64 and 70 are closed. Fundamentally, all that is necessary is that the shunt circuit be opened after the series circuit is closed, so that the series circuit may maintain the shunt circuit open so long as the voltage is high enough to force current into the battery.

The post 60 which carries the stationary auxiliary contact 70 is mounted in a metallic socket 72 having a base 73 mounted upon but insulated from the frame base 1. The lower end of the rod 60 is splined to receive the end of the set screw 78 to permit of axial adjustment of the post, or rod 60, but to limit the same against rotary motion. The post 60 and base 73 may be made integral since the main contact plate 59 is adjustable rotarily and axially, and since the auxiliary contact 64 is separately adjustable. Suitable screws 75 extend through a plate of insulating material 74 on the rear of the base member 1, and clamp the supporting base 73 of the post 60 upon the front of the base plate 1. One of these screws 75 is connected by a conductor 76 to the terminal post 10.

The series winding 77 of the relay is preferably wound upon the outside of the shunt winding 55. This may be varied. One terminal of the series winding 77 is connected to the post 11 by the conductor 78, and the opposite terminal of the series winding is connected to the grounded frame at the screw 21 on the back side of the base plate 1. Hence, this terminal of the series winding is connected to the armature bar 24 and to the contacts 45 in the shunt circuit and the contacts 64 and 58 in the series circuit.

It is believed that the operation of the device will be apparent from the foregoing detail description and from the circuit diagram of Fig. 11. The generator 80, which is preferably of the shunt field type, is connected to the terminals 8 and 11 on the base plate 1. The circuit from the negative pole of the generator 80 extends from the terminal 11 through the series winding 77, armature bar 24, contacts 45 and 46, to the shunt winding 55, to the terminal 8, and thus back to the negative pole of the generator. When the voltage of the generator rises to a value sufficient to cause current to flow into the storage battery 81, the effect of the windings 55 and 77 operating upon the armature 23 attracts the armature and closes the arcing contacts 64 and 70. The current flow through the series winding is thereby increased by the flow to battery 81 and this results in increased attraction of the armature 23. Further movement of the armature bar at once opens the shunt winding contacts 45, 46, and closes the main contacts 58, 59. The adjustment of the tension spring 39 and the air gap of the armature with respect to the magnetic cores is such that the flow of current through the series winding alone upon closing of the contacts, by the aforesaid combined attraction of the two windings, is sufficient to hold the armature attracted and the contacts in the position into which they have moved.

When the voltage of the generator 80 falls substantially to zero, the attraction of the cores 3 and 4 for the armature 23 becomes insufficient to hold the contacts in the series circuit closed, with the result that the series circuit is opened and the shunt circuit closed. It is to be observed that the direction of current flow is such with respect to the two windings 55 and 77 that they operate together to attract the armature, but if reverse current should flow through the relay during any period of simultaneous closing of the shunt and series contacts, the two windings would oppose each other. Hence, a very close adjustment of the contacts may be made with the assurance that the relay will open its circuit promptly and will not permit a small flow of current back through the relay to spin the generator when the wind velocity is at or slightly below the critical value.

I have run careful tests upon the system involving this relay and find that this relay cuts out at a value of current flow, which is very close to zero, and that it cuts in promptly and effectively at a voltage of the generator which is but slightly above the maximum voltage of the battery. The result is that with this relay it is possible for the wind driven generator 80 to generate more useful power in variable or slight wind than is the case with systems involving a less efficient relay.

Attention is called to the fact that due to the mounting of the movable contact 45 on the spring arm 44 in the manner shown, the two contacts 45 and 46 have with respect to each other a wiping action which insures good contact and always maintains the surfaces of the contacts in excellent condition, even though there is a tendency to form a slight arc when these contacts are opened.

The disposition of the laminations in the yoke 2 and in the armature 23 is such that these parts tend readily and quickly to be magnetized, and there is a less tendency for the armature to stick to the pole pieces than is the case in other relays with which I am familiar. I believe that this is due in large part to the manner of disposal of the laminations, namely, transversely to the lines of magnetic force issuing from the poles 3 and 4. The laminations are transverse to the lines of force issuing from the poles, and I conceive that the effect of these laminations disposed in this manner is comparable to a series of minute air gaps between the laminations, which tends effectively to prevent sticking of the armature to the poles through the effect of residual magnetism. In other words, the residual magnetism which is inherent in all magnetic materials as is apparent from the hysteresis diagram, is less effective where the magnetic structure is broken up by a series of minute air gaps offering no appreciable resistance to magnetization of a relatively high order, but sufficient to destroy the effect of residual magnetism which exhibits itself as a tendency of the armature to stick to the pole pieces.

Obviously the other features of improvement are not dependent upon the particular disposition of the laminations of the magnet system. It is to be observed that my relay is constructed in a manner to reduce mechanical and electrical complications to a minimum. If for any reason the battery circuit should be opened, the relay will not be overheated because the relay will vibrate and limit the heating. Also, this vibration will call attention of the improper condition and, therefore, operates as an alarm.

While I have described my invention in connection with the details of a particular embodiment, I do not intend to limit the invention to such details except as they are recited in the appended claims.

I claim:—

1. In a device of the class described, the combination of a series winding and a shunt winding, a pair of contacts in the series winding comprising a main contact and an arcing contact connected in parallel, the arcing contact closing ahead of the main contact, and a contact in the shunt winding adapted to be opened responsive to the closure of the arcing contact.

2. In a battery charging system, a main battery contact normally open, a shunt winding contact normally closed, a shunt winding and a series winding normally connected together in series through the normally closed contact, and an armature controlled by said windings for operating said contacts to close the circuit of the series winding through the battery contact and to open the circuit through the shunt winding through the shunt winding contact.

3. In combination, a movable armature bar having a main battery contact and a shunt winding contact, co-operating stationary contacts for the aforesaid movable contacts, a series winding having one terminal connected to both of said movable contacts and having the other terminal connected to the generator, a shunt winding having one terminal connected to the stationary shunt winding contact and the other terminal connected to the other side of the generator, the main battery contacts being closed and the shunt winding contacts being opened upon rise of the generator voltage to a predetermined value.

4. In a battery charging system, a relay having a series winding, a shunt winding, a movable switch member controlled by said windings and having means for connecting said windings in series across the generator leads for one position of the switch member, and means for disconnecting the shunt winding and connecting the series winding in series circuit between the generator and the battery for another position of the switch member.

5. In a battery charging system, a cut out relay having a shunt winding and a series winding connected together in series across the generator leads, and an armature switch controlled by said windings for connecting the series winding in series between the generator and battery and for disconnecting the shunt winding.

6. In a battery charging system, a generator, a battery, a relay having a shunt winding and a series winding, one end of the series winding being connected at all times to one lead of the generator, the other terminal of the series winding being connected to two switching contacts, one leading to the battery lead and the other leading to one terminal of the shunt winding, the other terminal of the shunt winding being connected to the second generator lead, and a magnetic armature controlling said contacts to switch the battery in series with the series winding and in parallel with the shunt winding, and thereafter disconnect the shunt winding.

7. In a battery charging system, a cutout relay having a shunt winding wound on the relay cores and a series winding wound outside of the shunt winding, said windings being connected together in series across the generator leads, and an armature switch controlled by said windings for connecting the series winding in series between the generator and battery and for disconnecting the shunt winding.

8. In a battery charging system, a combination with a generator, a battery, and a circuit extending from said battery to said generator, of a relay having two windings connected in series with each other and with said generator, means operative when the electromotive force impressed upon said circuit by said generator reaches a predetermined value for operating said relay to connect one of said windings in series with said battery, and means controlled by the last mentioned winding for opening the circuit of the other winding.

9. In a battery charging system, the combination with a generator, a battery, and circuit extending from said battery to said generator, of a relay having a first and second winding connected in series with each other and with said generator, and means operative when the electromotive force impressed upon said circuit by said generator reaches a predetermined value for operating said relay to connect the first of said windings in series with said battery and said generator, and opening the circuit of the second winding.

10. In a battery charging system, the combination with a generator, a battery, and circuit extending from said battery to said generator, of a relay having a first and second winding connected in series with each other and with said generator, means operative when the electromotive force impressed upon said circuit reaches a predetermined value for operating said relay to first connect said first winding in series with said battery and said generator and said second winding in multiple with the battery, and for then opening the circuit of said second winding.

In witness whereof, I hereunto subscribe my name this 27th day of October, 1925.

HARLIE O. PUTT.